United States Patent
Mizutani

[11] Patent Number: 6,099,410
[45] Date of Patent: Aug. 8, 2000

[54] LINEAR-MOTION ROLLING GUIDE UNIT WITH A FLANGE COVER

[75] Inventor: Haruo Mizutani, Mino, Japan

[73] Assignee: Nippon Thompson Co., Ltd., Tokyo

[21] Appl. No.: 09/002,028

[22] Filed: Dec. 31, 1997

[30] Foreign Application Priority Data

Feb. 6, 1997 [JP] Japan .................................. 9-036933

[51] Int. Cl.[7] .................................................. F16C 3/03
[52] U.S. Cl. ........................................ 464/168; 464/167
[58] Field of Search .................................. 464/162, 168, 464/169, 170, 178; 384/43, 49

[56] References Cited

U.S. PATENT DOCUMENTS

| | | | |
|---|---|---|---|
| 2,908,152 | 10/1959 | Anderson | 464/168 |
| 3,143,867 | 8/1964 | Anderson | 464/168 |
| 3,364,669 | 1/1968 | Hufstedler et al. | 464/168 |
| 4,328,999 | 5/1982 | Olschewski et al. | 464/168 |
| 4,482,338 | 11/1984 | Walter et al. | 464/167 |
| 4,620,351 | 11/1986 | Teramachi | 464/168 |
| 4,634,296 | 1/1987 | Watanabe | 464/168 |
| 4,764,032 | 8/1988 | Tanaka | 464/168 |
| 4,764,154 | 8/1988 | Teramachi | 464/168 |
| 4,932,793 | 6/1990 | Milanov et al. | 464/168 |
| 4,981,459 | 1/1991 | Klinkenberg | 464/167 |
| 5,893,646 | 4/1999 | Mizutzni et al. | 384/43 |

FOREIGN PATENT DOCUMENTS 59-187112  10/1984  Japan .
5-087328  11/1993  Japan .

Primary Examiner—Lynne H. Browne
Assistant Examiner—Greg Binda
Attorney, Agent, or Firm—Browdy and Neimark

[57] ABSTRACT

The linear-motion rolling guide unit with a flange cover can easily provide the slider with a flange portion for mounting the slider to a mount and can reduce the production cost. The linear-motion rolling guide unit with a flange cover includes an outer cylinder forming the slider, which is sleeved over the elongate track rail having longitudinally extending raceway grooves formed in the outer surface thereof so that the outer cylinder can slide on the track rail and receive rotary torque from it. To securely fix the outer cylinder to the mount, the linear-motion rolling guide unit has a flange cover that comprises a cover body covering the outer cylinder, a flange portion formed at one end of the cover body and having mounting holes, and a locking portion formed at the other end of the cover body and extending inwardly to engage the end face of the outer cylinder. The flange cover can be formed easily by deep drawing of a sheet steel.

6 Claims, 3 Drawing Sheets

LINEAR-MOTION ROLLING GUIDE UNIT WITH A FLANGE COVER

BACKGROUND OF THE INVENTION

1. Field of the Invention

The present invention relates to a linear-motion rolling guide unit with a flange cover, in which a slider is mounted slidable on a track rail having longitudinally extending raceway grooves, with a number of balls interposed between the slider and the track rail.

2. Description of the Prior Art

A ball spline, in which a slider is linearly moved along a ball spline shaft with balls held in a retainer rolling between the slider and the shaft, has found applications in industrial robots and transfer machines. The ball spline forms a linear-motion rolling guide unit (a kind of bearing) and includes an elongate ball spline shaft and a slider slidable on the ball spline shaft and receiving rotary torque from the ball spline shaft.

A known example of the ball spline with a retainer is a linear-motion ball bearing. The linear-motion ball bearing comprises mainly an outer cylinder, a retainer, balls as rolling elements, and retainer rings. The retainer has formed in its outer circumference circuit-like circulation passages for endlessly guiding the circulating balls. The inner surface of the outer cylinder is formed with raceway portions where the balls are loaded while rolling, inclined surfaces for smoothly circulating the balls from the raceway portions to unloaded escape portions, and circumferentially inclined rounded surfaces forming return passages for the balls (see Japanese Patent Laid-Open No. 187112/1984).

Another known example of the ball spline is one that has a flange provided to the outer cylinder to allow the ball spline to be secured to a mount such as housing, case and frame. This ball spline comprises an elongate guide shaft, a bearing cylinder body loosely sleeved over the guide shaft so that it is slidable on the guide shaft, a retainer interposed between the flanged bearing cylinder body and the guide shaft to hold the balls, and a flange secured to the bearing cylinder body by nickel brazing (see Japanese Utility Model Laid-Open No. 87328/1993).

For the ball spline to be securely installed on a mount such as housing, case and frame, as described above, a structure is known in which a flange is fixed, as by welding, to the end of the outer cylinder that forms the slider in the ball spline. The ball spline that fixes the flange to the outer cylinder, however, requires the outer cylinder or the flange to be machined into a shape or structure that allows fixing of the flange to the outer cylinder. It is also necessary to machine the outer cylinder and the flange to a high precision for securing them together and to fix the flange to the outer cylinder firmly, which in turn increases the manufacture cost.

SUMMARY OF THE INVENTION

The object of this invention is to solve the problems described above and to provide a linear-motion rolling guide unit with a flange cover, in which a cover body with a flange portion is securely press-fitted over the outer cylinder that forms a slider and which is formed by deep drawing to reduce the manufacturing cost, makes the securing of the flange cover to the outer cylinder easy, and can be applied to bearings such as ball splines.

This invention relates to a linear-motion rolling guide unit with a flange cover, which comprises an elongate track rail having longitudinally extending first raceway grooves formed in the outer surface thereof; a slider sleeved over the track rail so as to slide relative to the track rail and receive rotary torque; and a flange cover having a cover body covering the outer cylinder of the slider and a flange portion formed with mounting holes to securely mount the slider to a mount.

In the linear-motion rolling guide unit with a flange cover, the cover body is formed at one end with the flange portion and at the other end with a locking portion that extends inwardly to engage the end face of the outer cylinder.

The cover body, the locking portion and the flange portion of the flange cover are formed by deep drawing of a sheet steel.

The cover body of the flange cover is securely press-fitted over the outer surface of the outer cylinder.

The linear-motion rolling guide unit with a flange cover can be applied to a ball spline whose track rail is a ball spline shaft. In this case, the slider comprises: the outer cylinder having longitudinally extending second raceway grooves facing the first raceway grooves of the track rail; retainers fitted in the outer cylinder and having window portions facing the first raceway grooves of the ball spline shaft; return passages extending along the window portions and direction changing passages connecting the window portions and the return passages; balls rolling in raceways formed through the window portions by the first raceway grooves and the second raceway grooves; rings installed between the outer cylinder and the retainers to form guides for changing the travel direction of the balls; end plates fitted in the outer cylinder adjacent the rings; and retainer rings installed in ring grooves formed in the outer cylinder to securely hold the retainers, the rings and the end plates. The retainers can be divided in two in areas of the direction changing passages.

In this linear-motion rolling guide unit with a flange cover, the retainers, the balls, the rings, the end plates and the retainer rings are all accommodated in the outer cylinder. Hence, by simply press-fitting the flange cover over the outer cylinder, the flange portion to be attached to a mount can be easily provided to the slider.

Because the linear-motion rolling guide unit with a flange cover is constructed as described above and the outer cylinder forming the slider accommodates the retainers, balls, rings, end plates and retainer rings, the flange cover can be easily attached to the slider by press-fitting the cover body of the flange cover over the outer cylinder. Further, because the flange cover is formed with the flange portion and the locking portion, it is easily secured to a mount such as housing and equipment by inserting bolts through the mounting holes formed in the flange portion. Because the locking portion of the flange cover works as a stopper when press-fitting the flange cover over the outer cylinder, the slider can be positioned correctly and firmly secured in the flange cover.

In the linear-motion rolling guide unit with a flange cover, simply press-fitting the flange cover over the outer cylinder of the slider allows the flange portion that is attached to the mount to be provided to the slider. This construction does not require high precision as does the conventional structure in which the flange portion is fixed to the outer cylinder as by welding. Hence, this unit can reduce the manufacturing cost. Furthermore, the flange cover of this unit can be easily formed by deep drawing of a sheet steel, further lowering the manufacturing cost. The linear-motion rolling guide unit with a flange cover can be applied easily to a ball spline in which the constitutional parts are accommodated in the outer cylinder.

DETAILED DESCRIPTION OF THE EMBODIMENT

The linear-motion rolling guide unit with a flange cover can be used as a ball spline, applicable to industrial robots, transfer machines and various other manufacturing equipment, which allows relative sliding motion and transmission of a rotary torque and in which a track rail is formed by a ball spline shaft.

Figure 2:
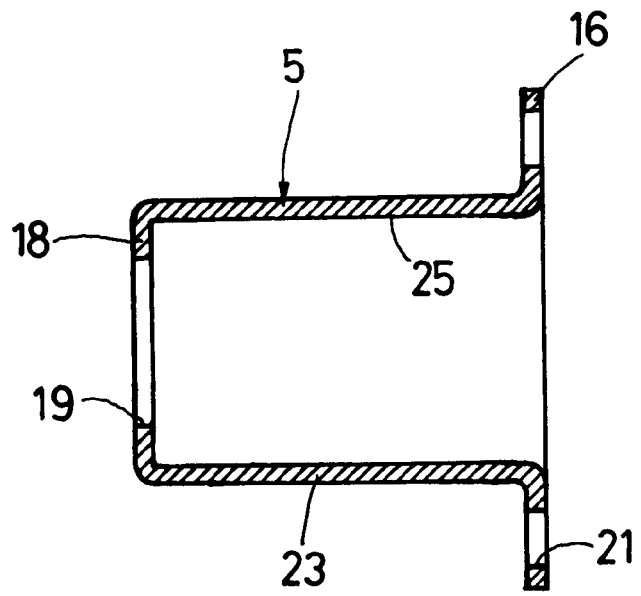
FIG. 2 is a cross section of one embodiment of the flange cover used in the linear-motion rolling guide unit with a flange cover.
Figure 3:
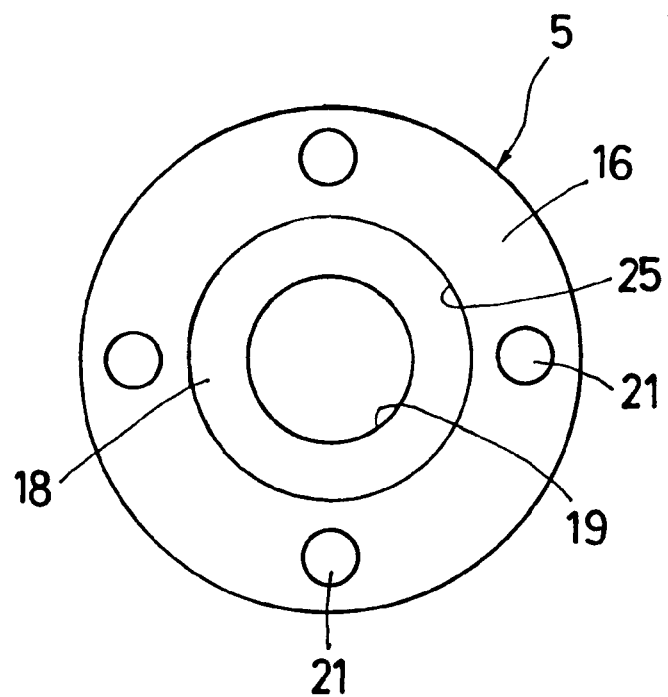
FIG. 3 is a side view of the flange cover of FIG. 2.

By referring to FIGS. 1, 2 and 3, one embodiment of the linear-motion rolling guide unit with a flange cover according to this invention will be described.

Figure 1:
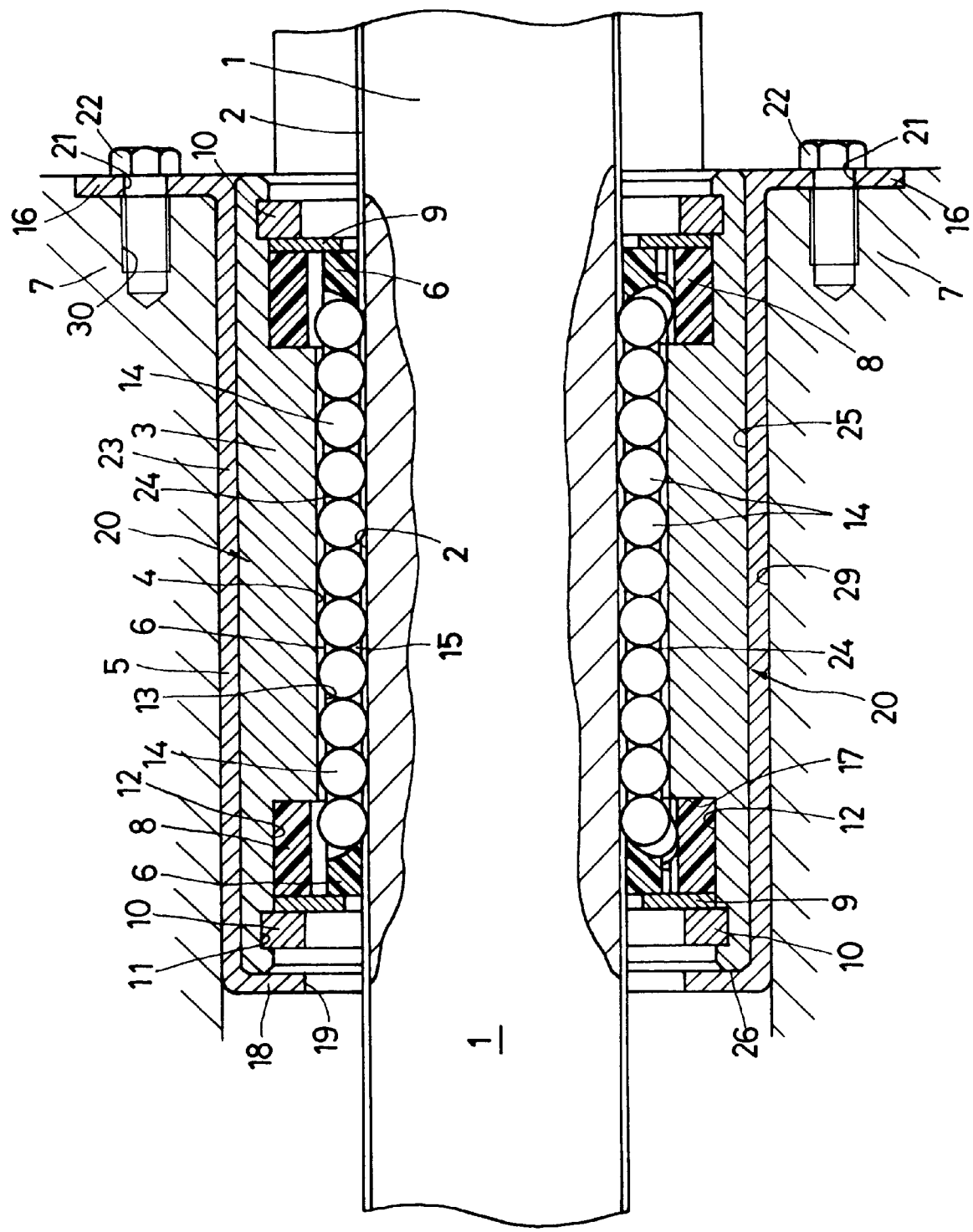
FIG. 1 is a cross section of one embodiment in which the linear-motion rolling guide unit with a flange cover according to this invention is applied to a ball spline.
Figure 4:
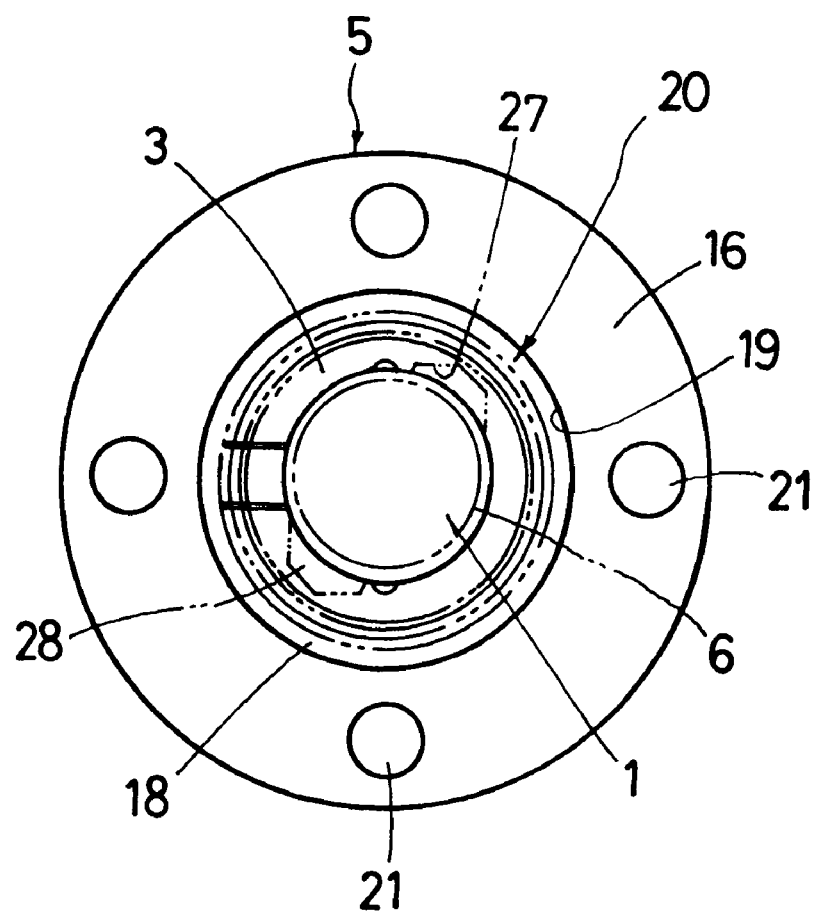
FIG. 4 is a side view of the linear-motion rolling guide unit with a flange cover of FIG. 1.

As shown in FIGS. 1 and 4, this embodiment of the linear-motion rolling guide unit with a flange cover represents a case where it is applied to a ball spline. When the linear-motion rolling guide unit with a flange cover is applied to a ball spline, a track rail 1 constitutes a ball spline shaft.

A slider 20 includes an outer cylinder 3 which has a pair of longitudinally extending raceway grooves 4 formed in a cylindrical inner surface thereof and facing raceway grooves 2 and which also has a pair of escape grooves spaced from the raceway grooves 4; retainers 6 fitted in the outer cylinder 3 and having window portions 15 formed therein; a number of balls 14 or rolling elements held by the retainers 6 that roll along raceways 24 defined by the raceway grooves 2, 4; a pair of rings 8 installed between the outer cylinder 3 and the retainers 6 at the ends of and inside the outer cylinder 3; a pair of end plates 9 placed in contact with the rings 8; and a pair of retainer rings 10 installed in ring grooves 11 formed adjacent the end plates 9 at the ends of the outer cylinder 3.

The linear-motion rolling guide unit with a flange cover includes mainly an elongate ball spline shaft 1 having a pair of longitudinally extending raceway grooves 2 formed in the outer surface thereof; a slider 20 slidably sleeved over the ball spline shaft 1 through a number of balls 14 to transmit a rotary torque; and a flange cover 5 to mount the outer cylinder 3 to a mount 7 such as housing. The slider 20 has a structure in which the constitutional parts including the retainers 6, rings 8, end plates 9, balls 14 and retainer rings 10 are all accommodated in the outer cylinder 3.

The linear-motion rolling guide unit with a flange cover comprises mainly the outer cylinder 3 that forms the slider 20 which is slidably mounted on an elongate track rail 1 in such a way that the slider can receive a rotary torque from the track rail 1 having a pair of raceway grooves 2 (first raceway grooves) longitudinally extending on the outer surface thereof. The flange cover 5 has a cover body 23, a locking portion 18 and a flange portion 16 and these parts are formed by deep drawing of a sheet steel.

The flange cover 5 is secured to the outer surface of the outer cylinder 3 by press-fitting or tight-fitting the cover body 23 having a hollow space 25 therein over the outer cylinder 3. To secure the outer cylinder 3 to the mount 7 such as housing, frame and equipment, the flange cover 5 has at one end the flange portion 16 formed with bolt holes 21 and at the other end the locking portion 18 extending inwardly to engage the end surface 26 of the outer cylinder 3. The track rail 1 extends through an opening 19 of the locking portion 18 and through the retainers 6 held in the outer cylinder 3.

In this linear-motion rolling guide unit with a flange cover, the outer cylinder 3 is formed to accommodate the retainers 6, balls 14, rings 8, end plates 9 and retainer rings 10 and thus by simply press-fitting the flange cover 5 over the outer cylinder 3 the slider 20 can be easily provided with the flange portion 16 that is to be attached to the mount 7.

To fix the slider 20 to the mount 7 involves the steps of, with the flange cover 5 press-fitted to the outer cylinder 3 of the slider 20 and secured to the outer cylinder 3, inserting the flange cover 5 into a mounting hole 29 of the mount 7 as shown in FIG. 1; inserting bolts 22 into the bolt holes 21 formed in the flange portion 16 of the flange cover 5; and screwing the bolts 22 into threaded holes 30 in the mount 7 to securely fix the flange cover 5 to the mount 7. Though not shown, the flange cover 5 to which the slider 20 is secured may be installed to project from the mount 7. Alternatively, when the mount 7 is a plate body such as housing, the slider 20 is secured to the plate body with the flange cover 5 projecting from the plate body.

The outer cylinder 3 has longitudinally extending raceway grooves 4 (second raceway grooves) formed therein that face the raceway grooves 2 of the ball spline shaft 1 and in which balls 14 roll while receiving load and transmitting rotary torque. Two or more raceway grooves 4 are formed in the inner surface of the outer cylinder 3 at locations opposing the raceway grooves 2 of the ball spline shaft 1. The outer cylinder 3 has two or more escape grooves formed therein that constitute outer walls of return passages of the balls 14. The outer cylinder 3 has a hollow portion 13 accommodating the retainers 6 and having the escape grooves 27 and also hollow portions 12, larger in diameter than the hollow portion 13, to form step portions 17 with which the rings 8 are placed in contact.

The retainers 6 have raised portions 28 projecting outwardly. The retainers 6 are inserted into the outer cylinder 3 by aligning the raised portions 28 with the escape grooves 27 of the outer cylinder 3. The retainers 6 are formed with window portions 15 extending longitudinally and having a width such that the balls 14 do not come off the window portions 15, with return grooves forming return passages extending parallel to the window portions 15, and with direction changing grooves forming direction changing passages. Two or more window portions 15 (in this embodiment, two window portions) are formed extending longitudinally between the raceway grooves 2 of the ball spline shaft 1 and the raceway grooves 4 of the outer cylinder 3. The balls 14 partly project from the window portions 15 to contact the raceway grooves 2 of the ball spline shaft 1 so that the balls 14 are loaded as they roll along raceways 24 defined by the raceway grooves 2 and the raceway grooves 4.

The retainers 6 also have formed in the outer surface thereof longitudinally extending return grooves that form the inner walls of the return passages and which face the escape grooves 27 of the outer cylinder 3. The return grooves and the window portions of the retainers 6 extend longitudinally parallel with each other, with the direction changing grooves formed in a curve to connect the return grooves and the window portions. Further, the retainers 6 may be divided in two in areas of the direction changing passages of the retainers 6 to facilitate loading the balls 14 into the raceways 24, the direction changing passages and the return passages.

The rings 8 are installed in the hollow portions 12 formed at the ends of the outer cylinder 3 between the outer cylinder 3 and the retainers 6. The rings 8 are situated where the direction changing passages are formed, and incorporated in the outer cylinder 3. In other words, the rings 8 work as inclined surfaces of ball guides that are formed in the conventional outer cylinder. The rings 8 are arranged in those parts of the outer cylinder 3 that correspond to the direction changing passages by which the running direction of the balls 14 is changed. Hence, the outer cylinder 3 need not be formed with the conventional inclined surfaces for changing the direction of travel of the balls 14.

The balls 14 are made to travel loaded in the raceways 24 formed through the window portions 15 by the raceway grooves 2 of the ball spline shaft 1 and the raceway grooves 4 of the outer cylinder 3. The return passages, through which the balls 14 return to their original positions after they rolled from one end of the raceways 24 to the other, are formed by the return grooves in the retainers 6 and the escape grooves in the outer cylinder 3. The direction changing passages through which the balls 14 are transferred from the raceways 24 to the return passages are formed by the direction changing grooves in the retainers 6 and the rounded recessed portions in the rings 8.

In this ball spline, therefore, a circuit-like endless circulation passage in which a large number of balls 14 can endlessly circulate rolling is formed by the raceways 24, the direction changing passages and the return passages (balls move through the raceways 24, the direction changing passages, the return passages, direction changing passages and the raceways 24 in that order). That is, the balls 14 are guided to roll endlessly along the raceways 24, which form a loaded area, and along the direction changing passages and the return passages, both of which form an unloaded area.

The end plates 9 are fitted in the outer cylinder 3 adjacent the rings 8. The end plates 9 are put in contact with the ends faces of the rings 8 and the retainers 6 to seal the clearance between the inner circumferential surfaces of the rings 8 and the outer circumferential surface of the retainers 6 and thus function as a dust-proofing cover. The end plates 9 may also be constructed, though not shown, as end seals which may comprise a metal core and a seal member secured to the metal core and arranged in sliding contact with the ball spline shaft 1. The seal member may be formed of a soft material such as rubber and synthetic rubber. The retainer rings 10 are formed of a split ring elastically fitted in the ring grooves 11 in the outer cylinder 3 to hold the retainers 6, rings 8 and end plates 9 in the outer cylinder 3.

What is claimed is:

1. A linear-motion rolling guide unit with a flange cover comprising:

an elongate track rail having longitudinally extending first raceway grooves formed in an outer surface thereof;

a slider sleeved over the track rail so as to slide relative to the track rail and receive rotary torque; and a flange cover comprising a cover body covering an outer cylinder of the slider and a flange portion formed with mounting holes to secure the slider to a mount;

wherein the cover body is formed at one end with the flange portion and at the other end with a locking portion engaging an end face of the outer cylinder and extending inwardly.

2. A linear-motion rolling guide unit with a flange cover according to claim 1, wherein the flange cover is formed by deep drawing of a sheet steel to have the cover body, the locking portion and the flange portion.

3. A linear-motion rolling guide unit with a flange cover according to claim 2 wherein the cover body of the flange cover is securely press-fitted over the outer surface of the outer cylinder.

4. A linear-motion rolling guide unit with a flange cover according to claim 1, wherein the track rail forms a ball spline shaft in a ball spline.

5. A linear-motion rolling guide unit with a flange cover according to claim 4 wherein the slider comprises: the outer cylinder having longitudinally extending second raceway grooves facing the first raceway grooves of the track rail; retainers fitted in the outer cylinder and having window portions facing the first raceway grooves of the ball spline shaft balls rolling in raceways formed through the window portions by the first raceway grooves and the second raceway grooves; rings installed between the outer cylinder and the retainers to form guides for changing the travel direction of the balls; end plates fitted in the outer cylinder adjacent the rings; and retainer rings installed in ring grooves formed in the outer cylinder to securely hold the retainers, the rings and the end plates.

6. A linear-motion rolling guide unit with a flange cover according to claim 5 wherein the retainers, the balls, the rings, the end plates and the retainer rings are all accommodated in the outer cylinder.

* * * * *